Figure 1:
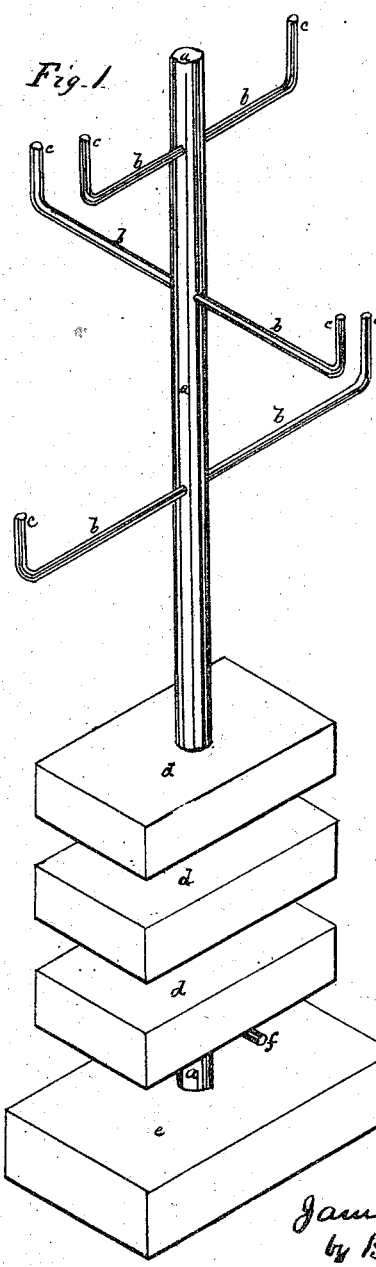

Sheet 1 - 2 Sheets

J. Lamont.
Fence & Trellis-Post.
Nº 75636.　　　　Patented Mar. 17, 1868.

Witnesses
W D Lewis
Blushing

Inventor
James Lamont
by Bakewell & Christy
his Attys

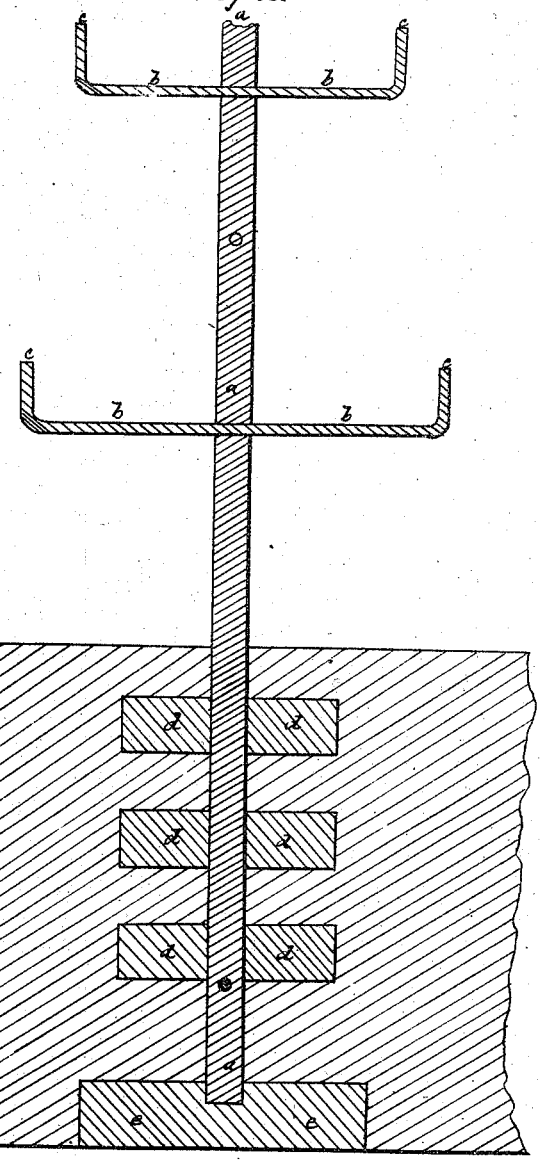

United States Patent Office.

JAMES LAMONT, OF PITTSBURG, PENNSYLVANIA.

Letters Patent No. 75,636, dated March 17, 1868.

IMPROVEMENT IN FENCE AND TRELLIS-POSTS.

The Schedule referred to in these Letters Patent and making part of the same.

TO ALL WHOM IT MAY CONCERN:

Be it known that I, JAMES LAMONT, of the city of Pittsburg, in the county of Allegheny, and State of Pennsylvania, have invented a new and useful Improvement in Planting Posts and Stakes; and I do hereby declare the following to be a full, clear, and exact description thereof, reference being had to the accompanying drawings, making a part of this specification, in which—

Figure 1 is a perspective view of a post with trellis-work for supporting vines, and Figure 2 is a vertical sectional view of the same planted in the earth—

The two figures illustrating my improved mode of supporting and steadying posts and stakes when planted in the ground.

Like letters of reference indicate like parts of each.

Numerous efforts have been made to construct iron posts of such shape as to be adapted for use as supports for vines, fences, &c., the chief difficulty having been to obtain the requisite stability, as such posts, to secure economy of material and a reasonable first cost, must necessarily be made small. Such posts or stakes, when planted in the earth, and loaded with the weight of a fence, or of fruit or ornamental vines, are exceedingly liable to be uprooted by wind or frost, or both, with consequent damage to the fence, or injury to the vines which they support. In this way considerable loss is often experienced; so much so, that the use of such posts for such purposes is comparatively rare.

My invention relates to an improved mode of constructing and setting stakes and posts for such uses, and particularly for use with a trellis-work, as shown in the drawings, as a support for vines; and the nature of it consists in planting in the earth the lower end of a post or stake, such lower end passing through or into supports of brick or other material, not liable to rapid decay, and by which, when the earth is well packed around them, such post or stake is so firmly held in place as not to be liable to be heaved upward by the frost or blown down by the wind.

To enable others skilled in the art to make and use my invention, I will proceed to describe its construction and how used.

I make, by casting or otherwise, a metallic post, $a$, of any desirable style, solid or hollow, at pleasure, of such size in cross-section as will insure the required strength, and of such length as may be necessary, allowing about three feet to be planted in the ground. If the post be designed for supporting vines, I make it long enough to stand from six to eight feet clear of the ground, and attach to its upper end metallic cross-bars $b\ b$, as many as may be required, at any desirable distances from each other, the upper one being short, and each next lower one being longer, so that the vine may be developed or trained into a tree-shape, with a well-rounded top. In this way I secure a vine of more symmetrical shape, and greater fruit-bearing capacity. To prevent the vines from being blown off the cross-bars $b$, I make the ends of the bars projecting upward, as at $c$. That such posts or stakes may be held firmly in the ground, I use a number of supports, $d\ e$, made preferably of brick, stone, or such other material as, when embedded in the earth, is not liable to rapid decay. Through each of the blocks $d$, I make a hole sufficiently large to admit the post $a$, and in the base, $e$, I make a step or socket, running part way through it, of the proper size and shape for receiving the foot of the post $a$. The blocks $d$, in any desirable number, I slip on to the foot of the post $a$, and sufficiently high up to be out of the way in setting the post. The base-block $e$, I place in the bottom of the post-hole, as shown in fig. 2, place the foot of the post $a$ in its step or socket, fill in a few inches of earth, and pack in well around and on top of it. I then slip down the lower one of the blocks $d$, first, however, passing through a hole previously made in the post, a pin, $f$, projecting outward on either or both sides, on which to rest the block thus slid down. Then the post $a$ cannot be displaced or "heaved" by the frost without raising the block $d$ resting on the pin $f$, and all the superposed earth. More earth is then filled in and packed, and the other blocks $d$ successively slid down, alternating with layers of earth till the post-hole is filled, the uppermost block being a few inches, more or less, below the surface of the ground. A projecting pin, $f$, may be placed immediately under each block $d$, if so desired, or if found necessary. In this way I plant a post with supports of any desirable size or number, whereby I secure an underground resisting surface sufficient to withstand the force of wind and frost, even when loaded with a heavy growth of vines, or supporting a fence. I also apply my invention to planting lamp and hitching-posts, and other similar uses.

The devices described can be cheaply made, easily put in place, and are durable. Dispensing with the trellis-work, such posts may be used as a support for fences which may be attached to and supported by them in the usual way. As a support for vines, an iron post is superior to the wooden stake ordinarily used, both as a protector against injury by lightning, and a promoter of the health of the vine. In the mellow ground of a garden or vineyard, some such device is not only desirable but necessary. Its durability is at least equal to the period of the life of the vine. It does not, like the wooden stake, need renewing, and consequently the vine is not liable to injury from that cause.

What I claim as my invention, and desire to secure by Letters Patent, is—

1. The combination, with a metallic post, $a$, for fences, trellis-work, &c., of a recessed base or step, $c$, and a series of blocks, $d$, through which the post $a$ passes, with or without the pins $f$, in the manner and for the purposes substantially as hereinbefore described.

2. In combination with a metallic post or stake, furnished with supports $d$ $e$, a trellis-work consisting of cross-bars $b$, with ends $c$ projecting upward, substantially as and for the purposes above set forth.

In testimony whereof, I, the said JAMES LAMONT, have hereunto set my hand.

JAMES LAMONT.

Witnesses:
 W. F. GRAHAM,
 C. H. CHRISTY.